United States Patent Office 3,409,814
Patented Nov. 5, 1968

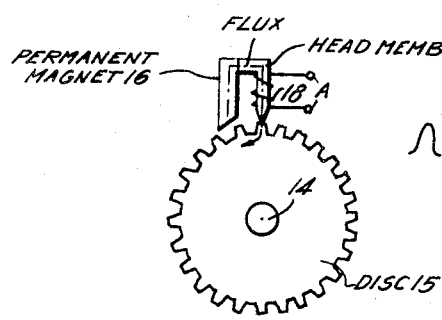
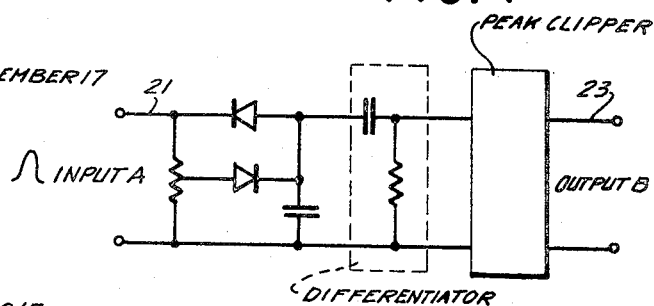
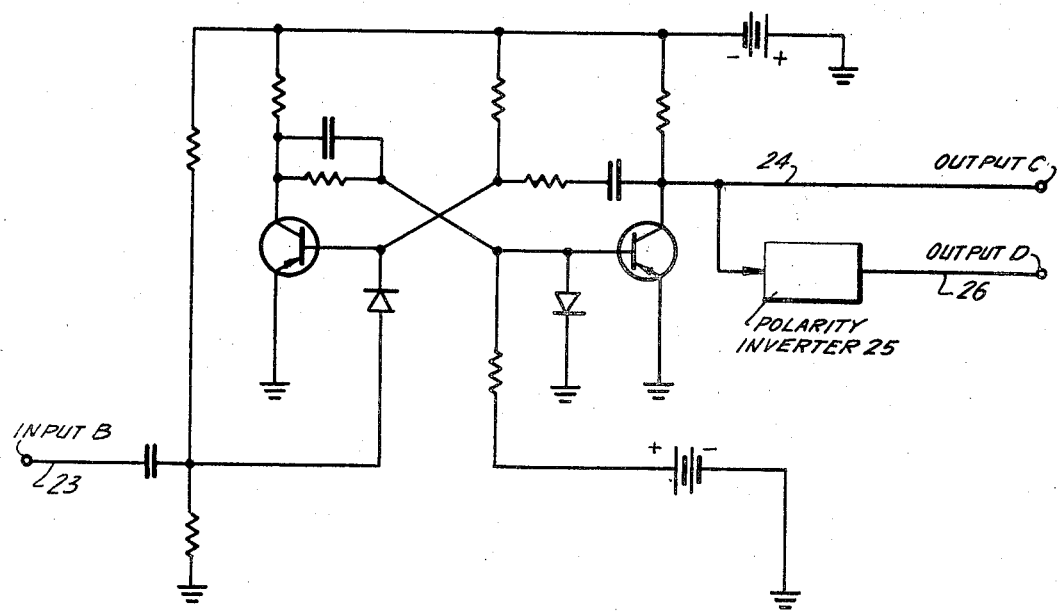
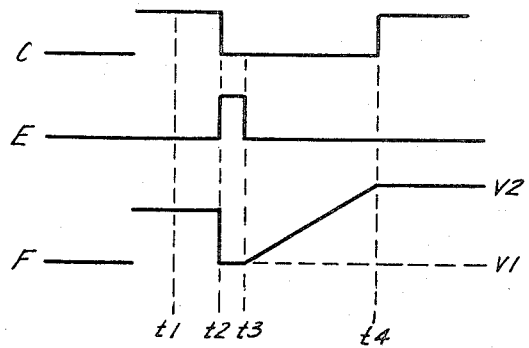

3,409,814
VARIABLE PULSE SYSTEM FOR CONTROLLING DC MOTOR SPEED BY VARIATION OF SUPPLIED CURRENT
Yasuo Azuma and Tamotu Takeuchi, Kawasaki-shi, Japan, assignors to Fujitsu Limited, Kawasaki, Japan, a corporation of Japan
Filed Mar. 9, 1966, Ser. No. 533,019
Claims priority, application Japan, Mar. 17, 1965, 40/15,774
5 Claims. (Cl. 318—341)

ABSTRACT OF THE DISCLOSURE

A speed indicator produces a speed signal having a plurality of spaced pulses and intervals between adjacent pulses varying inversely in duration with the speed of rotation of a motor. A time signal is produced from the speed signal and has a plurality of spaced time pulses of one polarity having equal pulse durations. The time pulses are spaced by pulses of the opposite polarity having pulse durations corresponding to the intervals between adjacent pulses of the speed signals. A pulse duration amplifier proportionally extends the durations of the opposite polarity pulses to produce a control signal having a plurality of pulses having pulse durations corresponding to the intervals between adjacent pulses of the speed signal and extended in duration over the durations of the opposite polarity pulses. A motor control supplies current to the motor and controls the current supplied to the motor by varying the rate of flow of current to the motor in accordance with the durations of the pulses of the control signal.

---

The present invention relates to a DC motor speed control system. More particularly, the invention relates to the control of the speed of a DC motor by variation of current supplied to such motor.

A speed control system is especially necessary in a driving system for driving storage tape such as, for example, magnetic tape or perforated tape. United States Patent No. 3,223,338, issued December 14, 1965, discloses a tape driving system in which the tape is driven only by a capstan which is directly driven by a low inertia DC motor. In such a tape driving system, or in any system in which the speed of a DC motor must be controlled, the DC motor speed control system of the present invention is especially applicable. This is due to the fact that in the tape driving system disclosed in said patent, the tape must be driven at constant speed until it is stopped. Since the DC motor of such a system which drives the tape must start, stop and reverse its direction of rotation, rapidly, the current supplied to said motor must be controlled in order to satisfactorily control the operation of said motor.

The principal object of the present invention is to provide a new and improved speed control system for a DC motor. The speed control system of the present invention maintains the speed of a DC motor constant. The speed control system of the present invention controls the speed of a DC motor which directly drives the capstan of a tape driving system such as described in United States Patent No. 3,223,338. The speed control system of the present invention controls the speed of a DC motor by controlling the current supplied to such motor and utilizes a variable pulse width monostable multivibrator to accomplish this.

In accordance with the present invention, a DC motor speed control system for controlling the speed of rotation of a rotating DC motor comprises a speed indicator in operative proximity with the rotating motor for producing a speed signal having a plurality of spaced pulses and intervals between adjacent pulses varying inversely in duration with the speed of rotation of said motor. A time signal unit coupled to the speed indicator produces from the speed signal a time signal having a plurality of spaced time pulses of one polarity having equal pulse durations, the time pulses being spaced by pulses of the opposite polarity having pulse durations corresponding to the intervals between adjacent pulses of the speed signals. A pulse duration amplifier connected to the time signal unit proportionally extends the durations of the opposite polarity pulses produced by the time signal unit to produce a control signal having a plurality of pulses having pulse durations corresponding to the intervals between adjacent pulses of the speed signal and extended in duration over the durations of the opposite polarity pulses. A motor control unit connected between the pulse duration amplifier and the motor supplies current to the motor and controls the current supply to the motor by varying the rate of flow of current to the motor in accordance with the durations of the pulses of the control signal. The DC motor speed control system of the present invention further comprises a clock unit connected between the speed indicator and the time signal unit for producing from the speed signal a clock signal having a plurality of spaced clock pulses of equal pulse duration and intervals between adjacent pulses varying in accordance with the intervals between adjacent pulses of the speed signals. A reset signal unit connected between the time signal unit and the pulse duration amplifier produces a reset signal having a plurality of spaced reset pulses of equal pulse duration and intervelas between adjacent pulses varying in accordance with the durations of the opposite polarity pulses produced by the time signal unit.

In accordance with the invention, the pulse duration amplifier comprises an integrator having an input connected to the time signal unit, another input connected to the reset signal unit and an output for producing from the time signal and from the reset signal an integrated signal having amplitudes substantially proportional to the durations of the opposite polarity pulses produced by the time signal unit, and a variable pulse duration monostable multivibrator having an input connected to the output of the integrator, another input connected to the clock unit and an output connected to the motor control unit.

In order that the present invention may be readily carried into effect, it will now be described with reference to the accompanying drawings, wherein:

FIG. 3 is a schematic diagram of an embodiment of a speed indicator which may be utilized in the system of FIG. 1;

FIG. 4 is a circuit diagram of an embodiment of a signal detector which may be utilized in the system of FIG. 1;

FIG. 5 is a circuit diagram of an embodiment of a time signal generator which may be utilized in the system of FIG. 1;

FIG. 7 is a graphical presentation, in enlarged scale, of parts of the curves C, E and F of FIG. 2;

Figure 1:
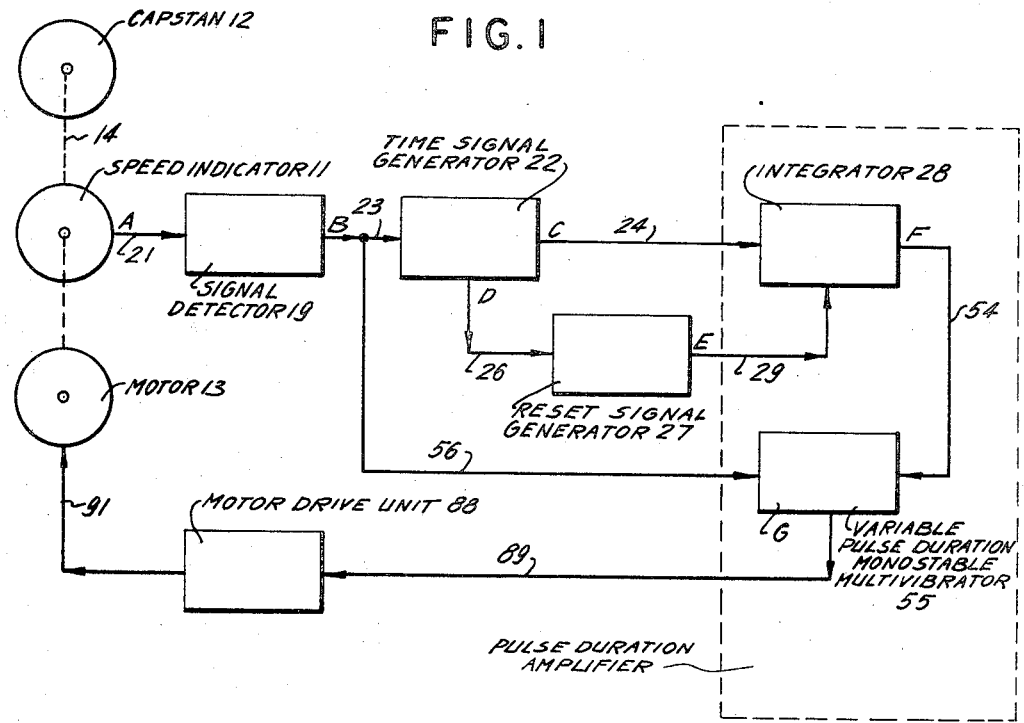
FIG. 1 is a schematic block diagram of an embodiment of the speed control system of the present invention.
Figure 2:
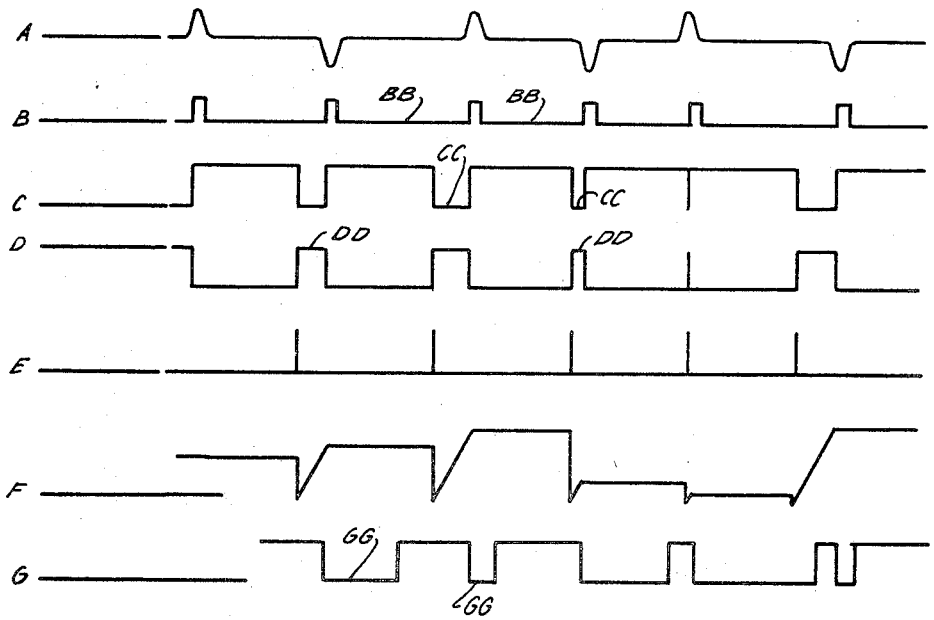
FIG. 2 is a graphical presentation of waveforms appearing in the system of FIG. 1.

In FIG. 1, a speed indicator 11 provides a signal A, illustrated as curve A of FIG. 2, corresponding to the speed of a capstan 12. The capstan 12 is driven by a DC motor 13 via a shaft 14 on which the speed indicator 11 is mounted. Any suitable speed indicator for indicating the speed of rotation of a rotating body may be utilized as the speed indicator 11. A suitable speed indicator 11 may comprise, for example, the speed indicator shown in FIG. 3. In FIG. 3, a gear-shaped or toothed disc 15 of magnetic material is coaxially mounted on the shaft 14, for rotation therewith. A permanent magnet 16 is mounted in proximity with the teeth of the disc 15. A head member 17 of magnetic material is positioned adjacent the magnet 16 and in proximity with the teeth of the disc 15. An output winding 18 is mounted on the head member 17.

When the disc 15 rotates with the shaft 14 driven by the motor 13, the magnetic reluctance of the head member 17 varies in accordance with the rotation of the teeth of said disc and electrical pulses are produced in the output winding 18. The duration of the intervals between adjacent pulses of the signal A varies inversely with the speed of rotation of the motor 13. The disc 15 may be replaced by a drum of magnetic material. The speed of rotation of the motor 13 is proportional to the number of pulses produced by the output winding 18. The signal A, indicating the speed of rotation of the motor 13, is suitably amplified (the amplifier is not shown in FIG. 1) and is supplied to a signal detector 19 via a lead 21.

Any suitable signal detector for detecting the signal A may be utilized as the signal detector 19. A suitable signal detector 19 may comprise, for example, the signal detector of FIG. 4. In FIG. 4, the signal detector produces clock pulses B when it receives the signal A. The clock pulses B are shown as curve B of FIG. 2. The signal detector circuit of FIG. 4 is fully disclosed in structure and operation in United States pending patent application Ser. No. 421,122, filed Dec. 24, 1964. Another suitable signal detector 19 may comprise, for example, the peak detector disclosed in United States Patent No. 3,064,243, issued Nov. 13, 1962.

The clock pulses B produced by the signal detector 19 are supplied to a time signal generator 22 via a lead 23. Any suitable monostable multivibrator for producing a time signal from the clock pulses B may be utilized as the time signal generator 22. A suitable time signal generator 22 may comprise, for example, the time signal generator of FIG. 5. In FIG. 5, the time signal generator produces at its output 24 a positive time signal pulse C of constant duration each time a clock pulse B is received. The time signal pulses C are illustrated as curve C of FIG. 2. The monostable multivibrator of FIG. 5 is a known monostable multivibrator which operates in a known manner.

The constant duration positive time signal pulses C are spaced from each other by intervals or negative pulses which vary in duration in proportion with the duration of the intervals of negative pulses of the clock pulses B. Thus, if the interval BB between adjacent clock pulses B is of short duration, the interval or negative pulse duration CC between adjacent positive time signal pulses C is of correspondingly short duration. Also, of course, if the interval BB between adjacent clock pulses B is of long duration, the interval or negative pulse duration CC between adjacent positive time signal pulses C is of correspondingly long duration. The intervals BB between the clock pulses B vary inversely with the speed of the motor 13, so that at high motor speeds said intervals are short and at low motor speeds said intervals are long.

The variation of the negative pulses or intervals CC of the time signal pulses C is insufficient to provide direct speed control of the motor 13, however. In accordance with the present invention, the intervals or negative pulse durations CC are thus amplified or extended in duration by the following circuitry, which functions as a pulse duration amplifier, and the amplified pulses are utilized to control the speed of the motor 13.

The time signal generator 22 includes a polarity inverter 25 of any suitable type connected to the output of the monostable multivibrator. The polarity inverter 25 thus produces time signal pulses D which are the same as the time signal pulses C except that the pulses C and D are of opposite polarity. The time signal pulses D are shown as curve D of FIG. 2 and are supplied via a lead 26 to a reset signal generator 27. The reset signal generator 27 may comprise any suitable monostable multivibrator such as, for example, that of FIG. 5.

The reset signal generator 27 produces a reset signal each time a positive time signal pulse DD is received from the time signal generator 22. The reset signals E produced by the reset signal generator 27 are shown as curve E of FIG. 2 and are of constant duration. The reset signals E produced by the reset signal generator 27 are supplied to one input of an integrator 28 via a lead 29. The time signal pulses C produced by the time signal generator 22 are supplied to the other input of the integrator 28 via the lead 24. The integrator 28 produces a signal F, shown as curve F of FIG. 2, having an amplitude which is substantially proportional to the intervals or negative pulse durations CC between the adjacent positive time signal pulses produced by the time signal generator 22. The signal F is produced by the integrator 28 each time it receives the pulses C and D.

Figure 6:
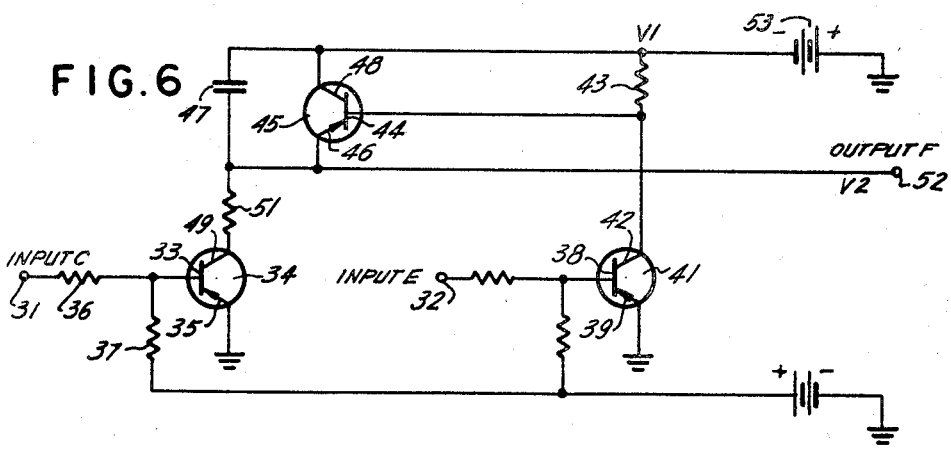
FIG. 6 is a circuit diagram of an embodiment of an integrator which may be utilized in the system of FIG. 1.

FIG. 6 shows an embodiment of the integrator 28 and the curves C, E and F of FIG. 7 are parts of the curves C, E and F of FIG. 2 in enlarged scale. At a time $t1$ in FIG. 7, the time signal C, supplied to an input terminal 31 of the integrator, has a positive voltage and the time signal E, supplied to another input terminal 32, has a negative voltage. When the signal C supplied to the input terminal 31 is positive, the base electrode 33 of a first transistor 34 is more positive than the emitter electrode 35 of said first transistor, due to resistors 36 and 37, so said first transistor is in its non-conductive condition.

The signal E supplied to the input terminal 32 is negative, when the signal C is positive, at the time $t1$ (FIG. 7), so the base electrode 38 and the emitter electrode 39 of a second transistor 41 are suitably biased to maintain said second transistor in its conductive condition. The collector electrode 42 of the second transistor 41 is then at ground potential. Ground potential appears at a resistor 43 and at the base electrode 44 of a third transistor 45, since said resistor and said base electrode are connected to the collector electrode 42 of the second transistor 41. The voltage of the emitter electrode 46 of the third transistor 45 does not exceed the ground potential in a positive direction, so said third transistor is in its non-conductive condition. Since the first and third transistors 34 and 45 are in their non-conductive condition, a capacitor 47, connected between the emitter electrode 46 and the collector electrode 48 of the third transistor and connected to the collector electrode 49 of the first transistor via a resistor 51, is neither charged nor discharged. The voltage of an output terminal 52, connected to the capacitor 47 and to the emitter electrode 46 of the third transistor 45, thus remains unchanged at V2, which is the voltage at which said capacitor is charged.

During the period between the time $t2$ and the time $t3$ (FIG. 7), the signal C supplied to the input terminal 31 is of negative voltage, so that the base electrode 33 and the emitter electrode 35 of the first transistor 34 are suitably biased to switch said first transistor to its conductive condition. The collector electrode 49 of the first transistor 34 is then at ground potential. Furthermore, during the period between the time $t2$ and the time $t3$, the signal E supplied to the input terminal 32 is of positive voltage, so that the base electrode 38 and the emitter electrode 39 of the second transistor 41 are suitably biased to switch said second transistor to its non-conductive condition.

When the second transistor 41 is in its non-conductive condition, there is no current flow through the resistor 43, so that the collector voltage of the second transistor and the base voltage of the third transistor 45 are decreased to the negative voltage provided by a negative voltage source 53. When the base voltage of the third transistor 45 decreases to a negative magnitude, the base electrode 44 and the emitter electrode 46 of the third transistor are suitably biased to switch said third transistor to its conductive condition. When the third transistor 45 is in its conductive condition, the capacitor 47 discharges through the emitter-collector path thereof. The voltage at the output terminal 52 then decreases to the negative voltage provided by the negative voltage source 53.

During the period between the time $t3$ and the time $t4$ (FIG. 7), the signal C supplied to the input terminal 31 is of negative voltage, as during the preceding period, so that the first transistor 34 remains in its conductive condition. During the period between the time $t3$ and the time $t4$, the signal E supplied to the input terminal 32 is of negative voltage, so that the second transistor 41 is switched to its conductive condition and the third transistor 45 is switched to its non-conductive condition. Although the third transistor 45 is in its non-conductive condition, the capacitor 47 continues to be charged through the resistor 51 as long as the first transistor 34 is in its conductive condition. The voltage at the output terminal 52 thus increases gradually at a time constant which is determined by the resistance of the resistor 51 and by the capacitance of the capacitor 47.

At the time $t4$ (FIG. 7), the signal C supplied to the input terminal 31 becomes positive in voltage, as prior to the time $t2$, so that the first transistor 34 is switched to its non-conductive condition. At the time $t4$, the signal E supplied to the input terminal 32 remains negative in voltage, as during the preceding period, so that the second transistor 41 remains in its conductive condition and the third transistor 45 remains in its non-conductive condition. When the first and third transistors 34 and 45 are in their non-conductive condition, the capacitor 47 remains charged at the voltage V2. The voltage V2 at the time $t4$ is the voltage of the capacitor 47 in its initial condition at the time $t1$, when said capacitor neither charges nor discharges.

The voltage of the signal F at the output terminal 52 varies during the period between the times $t3$ and $t4$ during which the capacitor 47 is charged, so that the signal F is provided at said output terminal. The amplitude of the voltage V2–V1 at the output terminal 52 during the period between the times $t3$ and $t4$ is determined by the time constant which is determined by the resistance of the resistor 51 and by the capacitance of the capacitor 47. The input terminal 31 of FIG. 6 is connected to the lead 24 in FIG. 1 and the input terminal 32 of FIG. 6 is connected to the lead 29 in FIG. 1. The output terminal 52 of FIG. 6 is connected to a lead 54 in FIG. 1.

The signal F produced by the integrator 28 is supplied to a variable pulse duration monostable multivibrator 55 via the lead 54. The signal B produced by the signal detector 19 is supplied to the variable pulse duration monostable multivibrator 55 via a lead 56. The multivibrator 55 produces a positive pulse control signal G, illustrated as curve G of FIG. 2, each time a clock pulse B is received from the signal detector 19 and the signal F is received from the integrator 28. The multivibrator 55 produces the control signal G with negative pulses GG or intervals between the positive pulses having a controlled variable duration determined by the signal F supplied to said multivibrator from the integrator 28. The operating time and therefore the duration of the pulse produced by the multivibrator 55 varies inversely with the amplitude of the signal F produced by the integrator 28. Thus, when the signal F supplied to the multivibrator 55 has a large amplitude, the operating time and the duration of the output pulse G of the multivibrator 55 are short and when the signal F has a small amplitude, the operating time and the duration of the output pulse G of the multivibrator 55 are long.

The negative pulses or intervals GG between the positive pulses of the control signal G have durations which are longer than the intervals CC between the positive pulses of the time signal C with a one clock pulse delay. This is an indication that the integrator 28 and the variable pulse duration monostable multivibrator 55 together function as a pulse duration amplifier to amplify or extend in duration the intervals or negative pulse durations CC.

Figure 8:
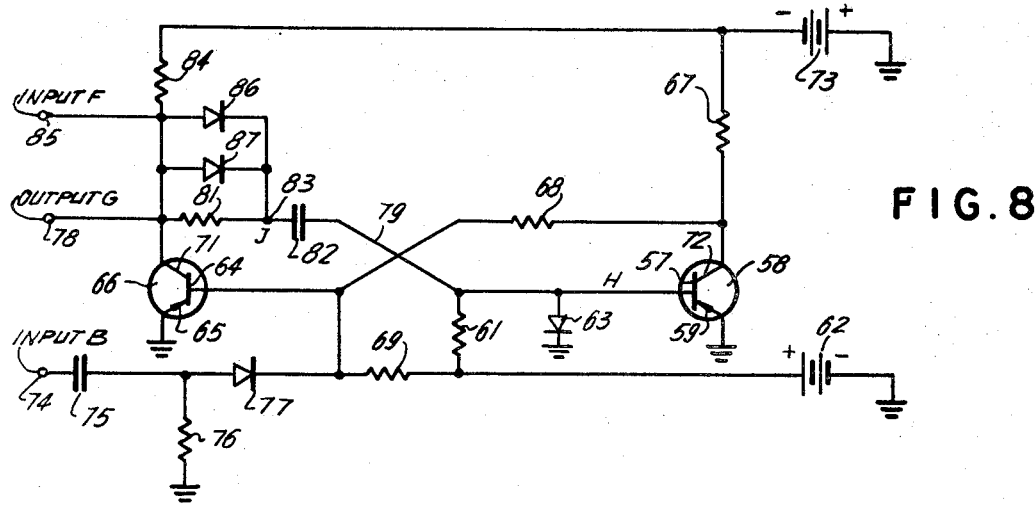
FIG. 8 is a circuit diagram of an embodiment of a variable pulse duration monostable multivibrator which may be utilized in the system of FIG. 1.
Figure 9:
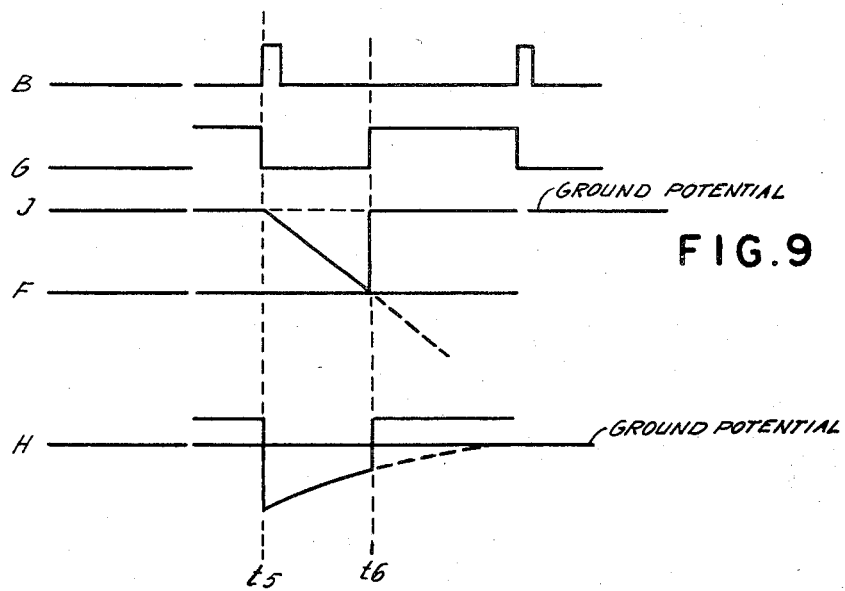
FIG. 9 is a graphical presentation, in enlarged scale, of parts of the curves B, F and G of FIG. 2.

FIG. 8 shows an embodiment of the variable pulse duration monostable multivibrator 55 and the curves B, F and G of FIG. 9 are parts of the curves B, F and G of FIG. 2 in enlarged scale. When the multivibrator of FIG. 8 is in its stable state, the base electrode 57 of a first transistor 58 has a positive voltage relative to the voltage of the emitter electrode 59 thereof and is thus in its non-conductive condition. The voltage relation between the base and emitter eletcrodes 57 and 59 of the first transistor 58 is determined by a resistor 61 through which said base electrode is connected to a positive voltage source 62 and by a diode 63 connected between said base electrode and a point at ground potential. The base electrode 64 and the emitter electrode 65 of a second transistor 66 are then suitably biased to maintain said second transistor in its conductive condition via resistors 67, 68 and 69. The collector electrode 71 of the second transistor 66 is then at ground potential.

The resistor 67 is connected between the collector electrode 72 of the first transistor 58 and the negative voltage source 73. The resistor 68 is connected between the collector electrode 72 of the first transistor 58 and the base electrode 64 of the second transistor 66. The resistor 69 is connected between the positive voltage source 62 and the base electrode 64 of the second transistor 66.

When a clock pulse B is supplied to an input terminal 74 at a time $t5$ (FIG. 9), such clock pulse is differentiated by a capacitor 75, and a resistor 76 connected to said input terminal. The positive pulses of the differentiated wave are supplied to the base electrode 64 of the second transistor 66 via a diode 77. When the positive pulse is supplied to the base electrode 64 of the second transistor 66, said second transistor is switched to its non-conductive condition. The control signal G voltage, provided at an output terminal 78, which is connected to the collector electrode 71 of the second transistor 66, then becomes negative, as shown in FIG. 9.

When the voltage of the control signal G at the output terminal 78 becomes negative, a differentiated pulse H, shown as curve H of FIG. 9, is supplied to the base electrode 57 of the first transistor 58 via a lead 79 from a resistor 81 and a capacitor 82. The resistor 81 and capacitor 82 function as a differentiator and the differentiated pulse H is of negative voltage at the time $t5$ (FIG. 9). When the negative differentiated pulse H is supplied to the base electrode 57 of the first transistor 58, said first transistor is switched to its conductive condition. The collector electrode 72 of the first transistor 58 is then at ground potential. When the collector electrode 72 of the first transistor 58 is at ground potential, the positive voltage pulse is still supplied to the base electrode 64 of the second transistor 66 via the resistors 68 and 69, so that said second transistor remains in its non-conductive condition.

At the time $t5$ (FIG. 9), The voltage J, shown as curve J of FIG. 9, at the common point 83 in the connection between the resistor 81 and the capacitor 82 decreases gradually. The decreasing magnitude of the voltage J is determined by the time constant determined by the resistances of the resistor 84 and 81 and by the capacitance of the capacitor 82. The signal F produced by the integrator 28 (FIG. 1) is supplied to an input terminal 85 (FIG. 8) and biases diodes 86 and 87 in their non-conductive or blocking direction in the period between the time *t5* and the time *t6* (FIG. 9). The diode 86 is connected between the input terminal 85 and the common point 83 and the diode 87 is connected between the common point 83 and the collector electrode 71 of the second transistor 66, across the resistor 81.

At the time *t6* (FIG. 9), the voltage J at the common point 83 tends to decrease to magnitudes less than the magnitude of the voltage of the signal F, but this is prevented by the diode 86 which is then biased in its forward or conductive direction. The diode 86 is biased to its conductive direction when its anode is biased more positive than its cathode by the signal F. The voltage J at the common point 83 then remains constant after the time *t6*, so that the negative differential pulse H no longer is supplied to the base electrode 57 of the first transistor 58. The first transistor 58 is then switched to its non-conductive condition and the multivibrator 55 returns to its stable state. The multivibrator 55 then remain in its stable state, without further operation, until a clock pulse B is supplied to the input terminal 74.

When the second transistor 66 is switched to its conductive condition and the multivibrator 55 returns to its stable state, the voltage J at the common point 83 increases gradually in accordance with the time constant determined by the resistance of the resistor 81 and the capacitance of the capacitor 82. However, if the next clock pulse B is supplied to the input terminal 74 before the magnitude of the voltage J reaches ground potential, the time of operation of the multivibrator 55 changes, even if the DC voltage signal F supplied to the input terminal 85 is constant in magnitude. For this reason, the diode 87 is connected in parallel with the resistor 81. The diode 87 permits the capacitor 82 to be charged rapidly and to return to ground potential after the second transistor 66 has been switched to its conductive condition.

It is thus seen that the durations of the pulses of the control signal G produced by the variable pulse duration monostable multivibrator 55 are varied in accordance with the DC voltage signal F produced by the integrator 28 and supplied to the input terminal 85 of said multivibrator via the lead 54 (FIG. 1). The control signal G (FIG. 2) is supplied to a a motor drive unit 88 via a lead 89. The motor drive unit 88 controls the speed of the motor 13 via a lead 91 by controlling the rate of flow of the drive current supplied to said motor in accordance with the durations of the pulses of the control signal G. The speed of rotation of the motor 13 is thus maintained at a constant level by increasing the rate of flow of current supplied to said motor when the durations of the pulses of the control signal G are longer, thereby indicating that the speed of said motor has decreased, and by decreasing the rate of flow of current supplied to said motor when the durations of the pulses of said control signal G are shorter, thereby indicating that the speed of said motor has increased.

While the invention has been described by means of a specific example and in a specific embodiment, we do not wish to be limited thereto, for obvious modifications will occur to those skilled in the art without departing from the spirit and scope of the invention.

We claim:

1. A DC motor speed control system for controlling the speed of rotation of a rotating DC motor, comprising speed indicating means in operative proximity with said rotating motor for producing a speed signal having a plurality of spaced pulses and intervals between adjacent pulses varying inversely in duration with the speed of rotation of said motor;

time signal means coupled to said speed indicating means for producing from said speed signal a time signal having a plurality of spaced time pulses of one polarity having equal pulse durations, said time pulses being spaced by pulses of the opposite polarity having pulse durations corresponding to the intervals between adjacent pulses of said speed signals;

pulse duration amplifier means connected to said time signal means for proportionally extending the durations of the opposite polarity pulses produced by said time signal means to produce a control signal having a plurality of pulses having pulse durations corresponding to the intervals between adjacent pulses of said speed signal and extended in duration over said duration of said opposite polarity pulses; and motor control means connected between said pulse duration amplifier means and said motor for supplying current to said motor and for controlling the current supplied to said motor by varying the rate of flow of current to said motor in accordance with the durations of the pulses of said control signal.

2. A DC motor speed control system as claimed in claim 1, further comprising clock means connected between said speed indicating means and said time signal means for producing from said speed signal a clock signal having a plurality of spaced clock pulses of equal pulse duration and intervals between adjacent pulses varying in accordance with the intervals between adjacent pulses of said speed signal, and reset signal means connected between said time signal means and said pulse duration amplifier means for producing a reset signal having a plurality of spaced reset pulses of equal pulse duration and intervals between adjacent pulses varying in accordance with the durations of the opposite polarity pulses produced by said time signal means.

3. A DC motor speed control system as claimed in claim 2, wherein said pulse duration amplifier means comprises integrator means having an input connected to said time signal means, another input connected to said reset signal means and an output for producing from said time signal and from said reset signal an integrated signal having amplitudes substantially proportional to the durations of the opposite polarity pulses produced by said time signal means.

4. A DC motor speed control system as claimed in claim 3, wherein said pulse duration amplifier means further comprises variable pulse duration monostable multivibrator means having an input connected to the output of said integrator means, another input connected to said clock means and an output connected to said motor control means.

5. A DC motor speed control system as claimed in claim 4, wherein each of said time signal means and said reset signal means comprises a monostable multivibrator.

References Cited

UNITED STATES PATENTS 3,079,539  2/1963  Guerth _____ 318—341 X
2,798,997  7/1957  Curtis _____ 318—318

ORIS L. RADER, *Primary Examiner.*

G. SIMMONS, *Assistant Examiner.*